United States Patent
Mekad et al.

(10) Patent No.: US 11,256,644 B2
(45) Date of Patent: Feb. 22, 2022

(54) DYNAMICALLY CHANGING CONFIGURATION OF DATA PROCESSING UNIT WHEN CONNECTED TO STORAGE DEVICE OR COMPUTING DEVICE

(71) Applicant: Fungible, Inc., Santa Clara, CA (US)

(72) Inventors: Sunil Mekad, Bangalore (IN); Prathap Sirishe, Milpitas, CA (US); Satish D Deo, Cupertino, CA (US)

(73) Assignee: FUNGIBLE, INC., Santa Clara, CA (US)

( * ) Notice: Subject to any disclaimer, the term of this patent is extended or adjusted under 35 U.S.C. 154(b) by 0 days.

(21) Appl. No.: 16/560,948

(22) Filed: Sep. 4, 2019

(65) Prior Publication Data

US 2020/0073840 A1 Mar. 5, 2020

(30) Foreign Application Priority Data

Sep. 5, 2018 (IN) .............................. 201841033337

(51) Int. Cl.
*G06F 13/40* (2006.01)
*G06F 9/4401* (2018.01)
(Continued)

(52) U.S. Cl.
CPC ........ *G06F 13/4022* (2013.01); *G06F 9/4411* (2013.01); *G06F 9/4418* (2013.01);
(Continued)

(58) Field of Classification Search
None
See application file for complete search history.

(56) References Cited

U.S. PATENT DOCUMENTS 8,417,911 B2 * 4/2013 Craddock ............... G06F 13/16
710/11
11,042,494 B1 * 6/2021 Saidi ................... G06F 9/45558
(Continued)

FOREIGN PATENT DOCUMENTS

WO 2009027189 A1 3/2009

OTHER PUBLICATIONS

Solomon, "PCI Express Basics & Background," PCI-SIG, PCIeTechnology Seminar, Oct. 27, 2014, 45 pp.
(Continued)

*Primary Examiner* — Henry Tsai
*Assistant Examiner* — Christopher A Bartels
(74) *Attorney, Agent, or Firm* — Shumaker & Sieffert, P.A.

(57) ABSTRACT

In one example, a data processing unit (DPU) includes a host unit interface for communicatively coupling to second device via a serial input/output (I/O) connection, and a control unit implemented in circuitry and configured to initially configure the host unit interface of a data processing unit to operate in endpoint mode, determine that the host unit interface of the data processing unit is to switch from operating in the endpoint mode to root complex mode, in response to determining that the host unit interface is to switch from operating in the endpoint mode to the root complex mode: configure the host unit interface to operate in the root complex mode, and send data to an I/O expander unit to cause the I/O expander unit to issue a reset signal to the second device, the second device being configured to operate in the endpoint mode.

22 Claims, 9 Drawing Sheets

(51) Int. Cl.
G06F 9/54 (2006.01)
G06F 13/12 (2006.01)
G06F 13/42 (2006.01)

(52) U.S. Cl.
CPC ............ G06F 9/544 (2013.01); G06F 13/122 (2013.01); G06F 13/4282 (2013.01); *G06F 2213/0026* (2013.01)

(56) References Cited

U.S. PATENT DOCUMENTS

| | | | | |
|---|---|---|---|---|
| 2009/0119665 | A1* | 5/2009 | Venkitachalam | ... G06F 11/2038 718/1 |
| 2010/0242039 | A1* | 9/2010 | Noguchi | ............ G06F 9/45558 718/1 |
| 2013/0191825 | A1* | 7/2013 | Muff | ................... G06F 9/30189 718/1 |
| 2014/0006670 | A1* | 1/2014 | Wagh | ................. G06F 13/4027 710/305 |
| 2015/0154041 | A1* | 6/2015 | Provis | ....................... G06F 9/54 718/1 |
| 2017/0371769 | A1* | 12/2017 | Merten | ............... G06F 11/3037 |
| 2018/0129269 | A1* | 5/2018 | Garg | ..................... G06F 9/4418 |
| 2018/0129270 | A1* | 5/2018 | Garg | ..................... G06F 9/3004 |
| 2018/0165455 | A1* | 6/2018 | Liguori | ................. G06F 9/4416 |
| 2018/0287965 | A1 | 10/2018 | Sindhu et al. | |
| 2018/0314654 | A1* | 11/2018 | Long | .................... G06F 3/0683 |
| 2018/0321948 | A1* | 11/2018 | Vaquero | .............. G06F 11/3051 |
| 2019/0012278 | A1 | 1/2019 | Sindhu et al. | |
| 2019/0013965 | A1 | 1/2019 | Sindhu et al. | |
| 2019/0104206 | A1 | 4/2019 | Goel et al. | |
| 2019/0104207 | A1 | 4/2019 | Goel et al. | |

OTHER PUBLICATIONS

SFF-8301 Specification for 3.5 Form Factor Drive Dimensions, Standardized as EIA-740 1999/07 at Rev 1.4, Aug. 30, 2014, 9 pp.
International Search Report and Written Opinion of International Application No. PCT/US2019/049607, dated Nov. 26, 2019, 11 pp.
International Preliminary Report on Patentability from International Application No. PCT/US2019/049607, dated Mar. 18, 2021, 6 pp.

* cited by examiner

DYNAMICALLY CHANGING CONFIGURATION OF DATA PROCESSING UNIT WHEN CONNECTED TO STORAGE DEVICE OR COMPUTING DEVICE

This application claims priority to India Patent Application No. 201841033337, filed Sep. 5, 2018, the entire contents of which are hereby incorporated by reference.

TECHNICAL FIELD

This disclosure relates to devices for processing packets of information, for example, in the fields of networking and storage.

BACKGROUND

In a typical cloud-based data center, a large collection of interconnected servers provides computing and/or storage capacity for execution of various applications. For example, a data center may comprise a facility that hosts applications and services for subscribers, i.e., customers of the data center. The data center may, for example, host all of the infrastructure equipment, such as compute nodes, networking and storage systems, power systems and environmental control systems.

In most data centers, clusters of storage systems and application servers are interconnected via a high-speed switch fabric provided by one or more tiers of physical network switches and routers. Data centers vary greatly in size, with some public data centers containing hundreds of thousands of servers, and are usually distributed across multiple geographies for redundancy. A typical data center switch fabric includes multiple tiers of interconnected switches and routers. In current implementations, packets for a given packet flow between a source server and a destination server or storage system are always forwarded from the source to the destination along a single path through the routers and switches comprising the switching fabric.

SUMMARY

In general, this disclosure describes a highly programmable device, referred to generally as a data processing unit, having multiple processing units for processing streams of information, such as network packets or storage packets. In some examples, the processing units may be processing cores, and in other examples, the processing units may be virtual processors, hardware threads, hardware blocks, or other sub-processing core units. As described herein, the data processing unit includes one or more host interface units, which may be PCI Express (PCIe) interfaces, that can be dynamically configured to operate in either root complex mode or endpoint mode of a PCIe input/output tree. In root complex mode, the host unit interface is configured to provide root complex functionality to connect the data processing unit to one or more endpoint devices, such as compute nodes or storage nodes, via the PCIe I/O tree. In endpoint mode, the host unit interface allows the data processing unit to act as an endpoint device on a PCIe I/O tree in which an device is configured to operate as a root complex for the PCIe I/O tree. In accordance with the techniques of this disclosure, the data processing unit may dynamically reconfigure each host unit interface in either endpoint mode or root complex mode without requiring reboot of the DPU or full reinitialization of the PCIe I/O tree.

In one example, a method includes initially configuring a host unit interface of a data processing unit to operate in endpoint mode for a serial input/output (I/O) connection, wherein the host unit interface is communicatively coupled to a second device via the I/O connection, determining that the host unit interface of the data processing unit is to switch from operating in the endpoint mode to root complex mode for the serial I/O connection, in response to determining that the host unit interface is to switch from operating in the endpoint mode to the root complex mode for the serial I/O connection: configuring the host unit interface to operate in the root complex mode for the serial I/O connection, and sending data to an I/O expander unit to cause the I/O expander unit to issue a reset signal to the second device, the second device being configured to operate in the endpoint mode for the serial I/O connection.

In another example, a data processing device includes a host unit interface configured to be communicatively coupled to a second device via a serial input/output (I/O) connection; and a control unit implemented in circuitry and configured to initially configure the host unit interface of a data processing unit to operate in endpoint mode for the serial I/O connection, determine that the host unit interface of the data processing unit is to switch from operating in the endpoint mode to root complex mode for the serial I/O connection, in response to determining that the host unit interface is to switch from operating in the endpoint mode to the root complex mode for the serial I/O connection: configure the host unit interface to operate in the root complex mode for the serial I/O connection, and send data to an I/O expander unit to cause the I/O expander unit to issue a reset signal to the second device, the second device being configured to operate in the endpoint mode for the serial I/O connection.

In another example, a system includes an input/output (I/O) expander unit; and a data processing unit comprising a host unit interface coupled to a second device separate from the data processing device, and a control unit implemented in circuitry and configured to initially configure the host unit interface of a data processing unit to operate in endpoint mode for the serial I/O connection, determine that the host unit interface of the data processing unit is to switch from operating in the endpoint mode to root complex mode for the serial I/O connection, in response to determining that the host unit interface is to switch from operating in the endpoint mode to the root complex mode for the serial I/O connection, configure the host unit interface to operate in the root complex mode for the serial I/O connection, and send data to the I/O expander unit to cause the I/O expander unit to issue a reset signal to the second device, the second device being configured to operate in the endpoint mode for the serial I/O connection, wherein the I/O expander unit is configured to issue the reset signal to the second device in response to receiving the data from the control unit of the data processing unit.

The details of one or more examples are set forth in the accompanying drawings and the description below. Other features, objects, and advantages will be apparent from the description and drawings, and from the claims.

DETAILED DESCRIPTION

Figure 1:
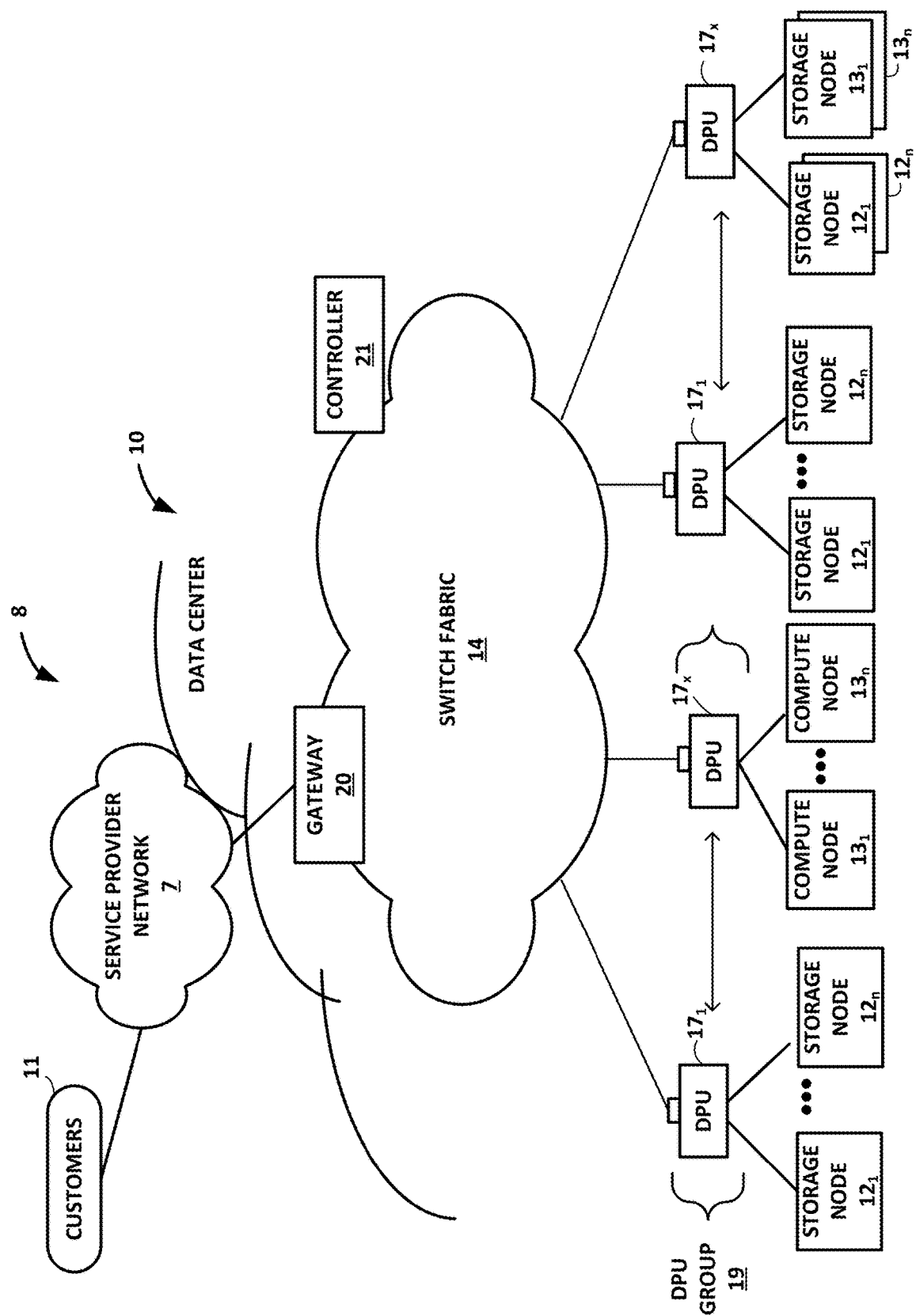
FIG. 1 is a block diagram illustrating an example system including one or more network devices configured to efficiently process a series of work units in a multiple core processor system.

FIG. 1 is a block diagram illustrating an example system 8 having a data center 10 in which examples of the techniques described herein may be implemented. In general, data center 10 provides an operating environment for applications and services for customers 11 coupled to the data center by content/service provider network 7 and gateway device 20. In other examples, content/service provider network 7 may be a data center wide-area network (DC WAN), private network or other type of network. Data center 10 may, for example, host infrastructure equipment, such as compute nodes, networking and storage systems, redundant power supplies, and environmental controls. Content/service provider network 7 may be coupled to one or more networks administered by other providers, and may thus form part of a large-scale public network infrastructure, e.g., the Internet.

In some examples, data center 10 may represent one of many geographically distributed network data centers. In the example of FIG. 1, data center 10 is a facility that provides information services for customers 11. Customers 11 may be collective entities such as enterprises and governments or individuals. For example, a network data center may host web services for several enterprises and end users. Other exemplary services may include data storage, virtual private networks, file storage services, data mining services, scientific- or super-computing services, and so on.

In this example, data center 10 includes a set of storage nodes 12 and compute nodes 13 interconnected via a high-speed switch fabric 14. In some examples, storage nodes 12 and compute nodes 13 are arranged into multiple different groups, each including any number of nodes up to, for example, n storage nodes $12_1$-$12_n$ and n compute nodes $13_1$-$13_n$ (collectively, "storage nodes 12" and "compute nodes 13").

Storage nodes 12 and compute nodes 13 provide storage and computation facilities, respectively, for applications and data associated with customers 11 and may be physical (bare-metal) servers, virtual machines running on physical servers, virtualized containers running on physical servers, or combinations thereof.

In the example of FIG. 1, software-defined networking (SDN) controller 21 provides a high-level controller for configuring and managing the routing and switching infrastructure of data center 10. SDN controller 21 provides a logically and in some cases physically centralized controller for facilitating operation of one or more virtual networks within data center 10. In some examples, SDN controller 21 may operate in response to configuration input received from a network administrator. In some examples, SDN controller 21 operates to configure data processing units (DPUs) 17 to logically establish one or more virtual fabrics as overlay networks dynamically configured on top of the physical underlay network provided by switch fabric 14. For example, SDN controller 21 may learn and maintain knowledge of DPUs 17 and establish a communication control channel with each of DPUs 17. SDN controller 21 uses its knowledge of DPUs 17 to define multiple sets (groups) of two of more DPUs 17 to establish different virtual fabrics over switch fabric 14. More specifically, SDN controller 21 may use the communication control channels to notify each of DPUs 17 for a given set which other DPUs 17 are included in the same set. In response, DPUs 17 dynamically setup FCP tunnels with the other DPUs included in the same set as a virtual fabric over packet switched network 410. In this way, SDN controller 21 defines the sets of DPUs 17 for each of the virtual fabrics, and the DPUs are responsible for establishing the virtual fabrics. As such, underlay components of switch fabric 14 may be unaware of virtual fabrics. In these examples, DPUs 17 interface with and utilize switch fabric 14 so as to provide full mesh (any-to-any) interconnectivity between DPUs of any given virtual fabric. In this way, the servers connected to any of the DPUs forming a given one of virtual fabrics may communicate packet data for a given packet flow to any other of the servers coupled to the DPUs for that virtual fabric using any of a number of parallel data paths within switch fabric 14 that interconnect the DPUs of that virtual fabric. More details of DPUs operating to spray packets within and across virtual overlay networks are available in U.S. Provisional Patent Application No. 62/638,788, filed Mar. 5, 2018, entitled "NETWORK DPU VIRTUAL FABRICS CONFIGURED DYNAMICALLY OVER AN UNDERLAY NETWORK" and U.S. patent application Ser. No. 15/939,227, filed Mar. 28, 2018, entitled "NON-BLOCKING ANY-TO-ANY DATA CENTER NETWORK WITH PACKET SPRAYING OVER MULTIPLE ALTERNATE DATA PATHS", the entire contents of each of which are incorporated herein by reference.

Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In accordance with the techniques of this disclosure, each of DPUs 17 may include a set of host unit interfaces to connect to storage nodes 12 and/or compute nodes 13. The host unit interfaces may be, for example, PCI Express (PCIe) interfaces. Conventional PCIe topologies implement a fixed root complex (RC) or endpoint mode for a PCIe controller, either by design or configuration at boot time. Recent changes in application-specific integrated circuits (ASICs) support mode selection of RC or EP at boot time only, via sampling configuration settings via external pin level sampling at boot time. In order to change modes in such conventional PCIe controllers, a reboot cycle is mandated.

With expanding PCIe application space in storage applications, new use cases have emerged. One such requirement is to be able to connect a PCIe endpoint device, like a non-volatile memory express (NVMe) solid state drive (SSD) to a PCIe controller (in RC mode). But with current design methodologies, designers have to select static PCIe controller mode (RC vs. EP).

DPUs 17, in accordance with the techniques of this disclosure, support emerging use cases, in which customers can dynamically unplug storage and/or compute connectivity operating in one mode (for example, EP) and change it to a mode that would need the controller to dynamically change over to RC mode. For example, PCIe controller-based systems may have an external PCIe connectivity option. In such cases, the system may have been connected to an external device, such as an x86 server that operates in RC mode, requiring the controller-based system to operate a related port in EP mode. However, a customer may unplug the cable connecting to the server and connect it to a storage device (e.g., just a bunch of flash (JBOF)). In such case, the JBOF now is in EP mode by default, requiring the controller-based system to change over to RC mode dynamically.

With respect to FIG. 1, an administrator of data center 10 may initially couple a host unit interface of one of DPUs 17 to one of compute nodes 13, in which case the host unit interface may be configured in EP mode. The administrator may subsequently couple the host unit interface to one of storage nodes 12, prompting the one of DPUs 17 to reconfigure the host unit interface to operate in RC mode. The techniques of this disclosure allow DPUs 17 to dynamically reconfigure host unit interfaces between EP mode and RC mode without requiring a restart or reboot of DPUs 17. In this manner, the techniques of this disclosure provide greater up time for DPUs 17 and simplify dynamic reconfiguration of, e.g., data center 10.

In accordance with the techniques of this disclosure, host unit controllers (e.g., PCIe controllers) of DPUs 17 may switch host unit interfaces between RC and EP modes at run time, without a need for a reboot of a host ASIC (e.g., a corresponding one of DPUs 17) or system reboot. This may be accomplished by using independent reset line paths for a host ASIC PCIe controller in EP vs. RC modes. The reset lines may correspond to a PERST# (PCIe Reset) line of PCIe. These techniques enable host unit interface controllers (e.g., host PCIe controllers) to meet interface link up timing requirements, while not requiring any additional logical design from the perspective of the remote interface controller.

Such dynamic support avoids having to reset/reboot entire system which is important since in recent systems, multiple controllers are supported and the systems interface with multiple different external devices in different modes simultaneously.

As further described herein, in one example, each DPU 17 is a highly programmable I/O processor specially designed for offloading certain functions from storage nodes 12 and compute nodes 13. In one example, each of DPUs 17 includes one or more processing cores consisting of a number of internal processor clusters, e.g., MIPS cores, equipped with hardware engines that offload cryptographic functions, compression and regular expression (RegEx) processing, data storage functions and networking operations. In this way, each DPU 17 includes components for fully implementing and processing network and storage stacks on behalf of one or more storage nodes 12 or compute nodes 13. In addition, DPUs 17 may be programmatically configured to serve as a security gateway for its respective storage nodes 12 or compute nodes 13, freeing up the processors of the servers to dedicate resources to application workloads. In some example implementations, each DPU 17 may be viewed as a network interface subsystem that implements full offload of the handling of data packets (with zero copy in server memory) and storage acceleration for the attached server systems. In one example, each DPU 17 may be implemented as one or more application-specific integrated circuit (ASIC) or other hardware and software components, each supporting a subset of the servers. DPUs 17 may also be referred to as access nodes, or devices including access nodes. In other words, the term access node may be used herein interchangeably with the term DPU. Additional example details of various example DPUs are described in U.S. Provisional Patent Application No. 62/559,021, filed Sep. 15, 2017, entitled "Access Node for Data Centers," and U.S. Provisional Patent Application No. 62/530,691, filed Jul. 10, 2017, entitled "Data Processing Unit for Computing Devices," the entire contents of both being incorporated herein by reference In example implementations, DPUs 17 are configurable to operate in a standalone network appliance having one or more DPUs. For example, DPUs 17 may be arranged into multiple different DPU groups 19, each including any number of DPUs up to, for example, x DPUs $17_1$-$17_x$. As such, multiple DPUs 17 may be grouped (e.g., within a single electronic device or network appliance), referred to herein as a DPU group 19, for providing services to a group of servers supported by the set of DPUs internal to the device. In one example, a DPU group 19 may comprise four DPUs 17, each supporting four servers so as to support a group of sixteen servers.

In the example of FIG. 1, each DPU 17 provides connectivity to switch fabric 14 for a different group of storage nodes 12 or compute nodes 13 and may be assigned respective IP addresses and provide routing operations for the storage nodes 12 or compute nodes 13 coupled thereto. As described herein, DPUs 17 provide routing and/or switching functions for communications from/directed to the individual storage nodes 12 or compute nodes 13. For example, as shown in FIG. 1, each DPU 17 includes a set of edge-facing electrical or optical local bus interfaces for communicating with a respective group of storage nodes 12 or compute nodes 13 and one or more core-facing electrical or optical interfaces for communicating with core switches within switch fabric 14. In addition, DPUs 17 described herein may provide additional services, such as storage (e.g., integration of solid-state storage devices), security (e.g., encryption), acceleration (e.g., compression), I/O offloading, and the like. In some examples, one or more of DPUs 17 may include storage devices, such as high-speed solid-state drives or rotating hard drives, configured to provide network accessible storage for use by applications executing on the servers. Although not shown in FIG. 1, DPUs 17 may be directly coupled to each other, such as direct coupling between DPUs in a common DPU group 19, to provide direct interconnectivity between the DPUs of the same group. For example, multiple DPUs 17 (e.g., 4 DPUs) may be positioned within a common DPU group 19 for servicing a group of servers (e.g., 16 servers).

As one example, each DPU group 19 of multiple DPUs 17 may be configured as standalone network device, and may be implemented as a two rack unit (2RU) device that occupies two rack units (e.g., slots) of an equipment rack. In another example, DPU 17 may be integrated within a server, such as a single 1RU server in which four CPUs are coupled to the forwarding ASICs described herein on a mother board deployed within a common computing device. In yet another example, one or more of DPUs 17, storage nodes 12, and compute nodes 13 may be integrated in a suitable size (e.g., 10RU) frame that may, in such an example, become a network storage compute unit (NSCU) for data center 10. For example, a DPU 17 may be integrated within a mother board of a storage node 12 or a compute node 13 or otherwise co-located with a server in a single chassis.

In some example implementations, DPUs 17 interface and utilize switch fabric 14 so as to provide full mesh (any-to-any) interconnectivity such that any of storage nodes 12 or compute nodes 13 may communicate packet data for a given packet flow to any other of the servers using any of a number of parallel data paths within the data center 10. For example, in some example network architectures, DPUs spray individual packets for packet flows between the DPUs and across some or all of the multiple parallel data paths in the data center switch fabric 14 and reorder the packets for delivery to the destinations so as to provide full mesh connectivity.

In this way, DPUs 17 interface and utilize switch fabric 14 so as to provide full mesh (any-to-any) interconnectivity such that any of storage nodes 12 or compute nodes 13 may communicate packet data for a given packet flow to any other of the servers using any of a number of parallel data paths within the data center 10. For example, in some example network architectures, DPUs spray individual packets for packet flows between the DPUs and across some or all of the multiple parallel data paths in the data center switch fabric 14 and reorder the packets for delivery to the destinations so as to provide full mesh connectivity.

As described herein, a data transmission protocol referred to as a Fabric Control Protocol (FCP) may be used by the different operational networking components of any of DPUs 17 to facilitate communication of data across switch fabric 14. As further described, FCP is an end-to-end admission control protocol in which, in one example, a sender explicitly requests a receiver with the intention to transfer a certain number of bytes of payload data. In response, the receiver issues a grant based on its buffer resources, QoS, and/or a measure of fabric congestion. In general, FCP enables spray of packets of a flow to all paths between a source and a destination node, and may provide numerous advantages, including resilience against request/grant packet loss, adaptive and low latency fabric implementations, fault recovery, reduced or minimal protocol overhead cost, support for unsolicited packet transfer, support for FCP capable/incapable nodes to coexist, flow-aware fair bandwidth distribution, transmit buffer management through adaptive request window scaling, receive buffer occupancy based grant management, improved end to end QoS, security through encryption and end to end authentication and/or improved ECN marking support. More details on the FCP are available in U.S. Provisional Patent Application No. 62/566,060, filed Sep. 29, 2017, entitled "Fabric Control Protocol for Data Center Networks with Packet Spraying Over Multiple Alternate Data Paths," the entire content of which is incorporated herein by reference.

The use of FCP may provide certain advantages. For example, the use of FCP may increase significantly the bandwidth utilization of the underlying switch fabric 14. Moreover, in example implementations described herein, the servers of the data center may have full mesh interconnectivity and may nevertheless be non-blocking and drop-free.

Although DPUs 17 are described in FIG. 1 with respect to switch fabric 14 of data center 10, in other examples, DPUs may provide full mesh interconnectivity over any packet switched network. For example, the packet switched network may include a local area network (LAN), a wide area network (WAN), or a collection of one or more networks. The packet switched network may have any topology, e.g., flat or multi-tiered, as long as there is full connectivity between the DPUs. The packet switched network may use any technology, including IP over Ethernet as well as other technologies. Irrespective of the type of packet switched network, DPUs may spray individual packets for packet flows between the DPUs and across multiple parallel data paths in the packet switched network and reorder the packets for delivery to the destinations so as to provide full mesh connectivity.

Figure 2:
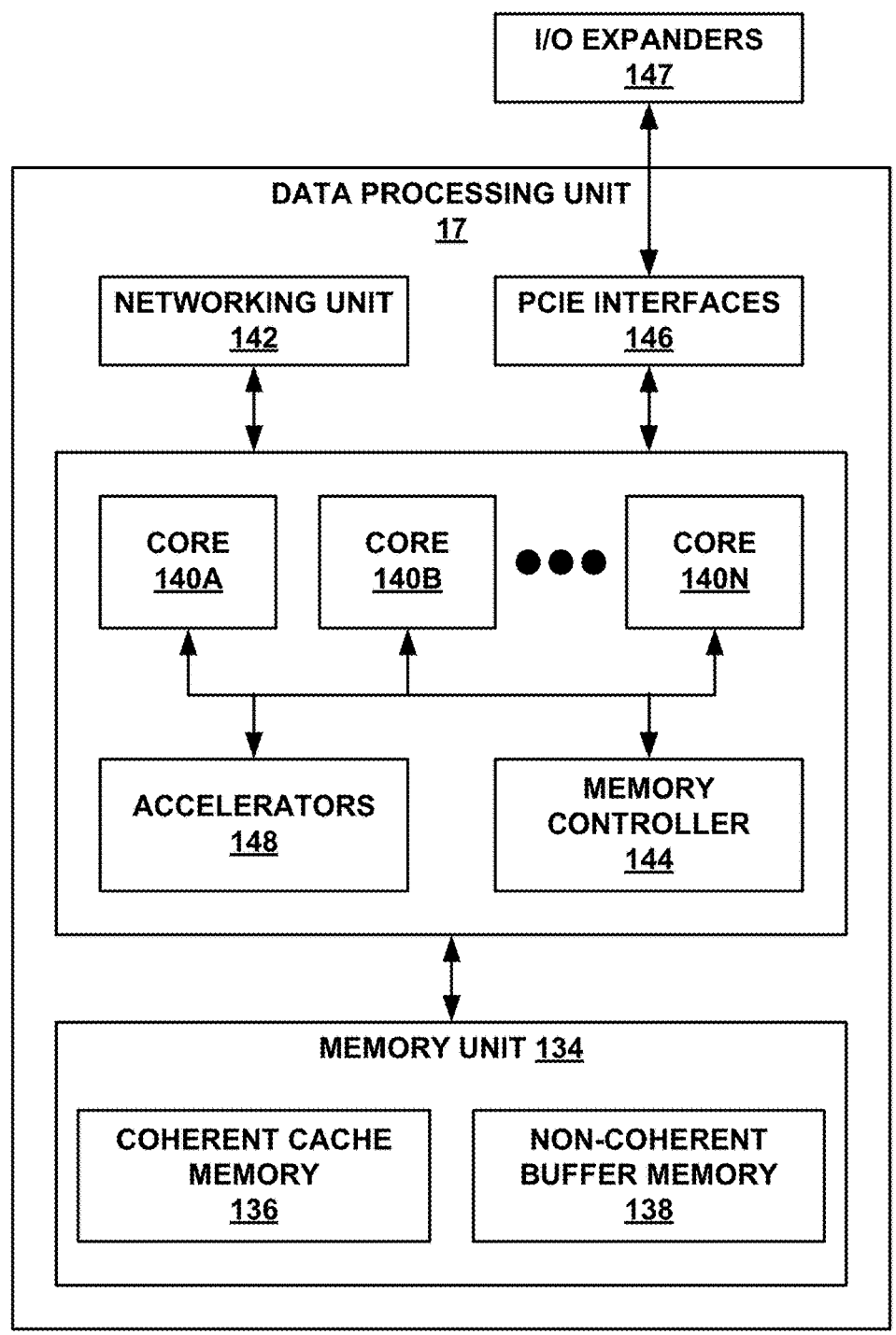
FIG. 2 is a block diagram illustrating an example data processing unit (DPU) in accordance with the techniques of this disclosure.

FIG. 2 is a block diagram illustrating an example data processing unit (DPU) 17 of FIG. 1 in further detail, in accordance with the techniques of this disclosure. DPU 17 generally represents a hardware chip implemented in digital logic circuitry. DPU 17 may operate substantially similar to any of DPUs $17_1$-$17_N$ of FIG. 1. Thus, DPU 17 may be communicatively coupled to a CPU, a GPU, one or more network devices, server devices, random access memory, storage media (e.g., solid state drives (SSDs)), a data center fabric, or the like, e.g., via PCI-e, Ethernet (wired or wireless), or other such communication media.

In the illustrated example of FIG. 2, DPU 17 includes a plurality of programmable processing cores 140A-140N ("cores 140") and a memory unit 134. Memory unit 134 may include two types of memory or memory devices, namely coherent cache memory 136 and non-coherent buffer memory 138. In some examples, plurality of cores 140 may include at least two processing cores. In one specific example, plurality of cores 140 may include six processing cores. DPU 17 also includes a networking unit 142, one or more PCIe interfaces 146, a memory controller 144, and one or more accelerators 148. As illustrated in FIG. 2, each of cores 140, networking unit 142, memory controller 144, PCIe interfaces 146, accelerators 148, and memory unit 134 including coherent cache memory 136 and non-coherent buffer memory 138 are communicatively coupled to each other.

In this example, DPU 17 represents a high performance, hyper-converged network, storage, and data processor and input/output hub. Cores 140 may comprise one or more of MIPS (microprocessor without interlocked pipeline stages) cores, ARM (advanced RISC (reduced instruction set computing) machine) cores, PowerPC (performance optimization with enhanced RISC-performance computing) cores, RISC-V (RISC five) cores, or CISC (complex instruction set computing or x86) cores. Each of cores 140 may be programmed to process one or more events or activities related to a given data packet such as, for example, a networking packet or a storage packet. Each of cores 140 may be programmable using a high-level programming language, e.g., C, C++, or the like.

As described herein, the new processing architecture utilizing a DPU may be especially efficient for stream processing applications and environments. For example, stream processing is a type of data processing architecture well suited for high performance and high efficiency processing. A stream is defined as an ordered, unidirectional sequence of computational objects that can be of unbounded or undetermined length. In a simple embodiment, a stream originates in a producer and terminates at a consumer, and is operated on sequentially. In some embodiments, a stream can be defined as a sequence of stream fragments; each stream fragment including a memory block contiguously addressable in physical address space, an offset into that block, and a valid length. Streams can be discrete, such as a sequence of packets received from the network, or continuous, such as a stream of bytes read from a storage device. A stream of one type may be transformed into another type as a result of processing. For example, TCP receive (Rx) processing consumes segments (fragments) to produce an ordered byte stream. The reverse processing is performed in the transmit (Tx) direction. Independently of the stream type, stream manipulation requires efficient fragment manipulation, where a fragment is as defined above.

In some examples, the plurality of cores 140 may be capable of processing a plurality of events related to each data packet of one or more data packets, received by networking unit 142 and/or PCIe interfaces 146, in a sequential manner using one or more "work units." In general, work units are sets of data exchanged between cores 140 and networking unit 142 and/or PCIe interfaces 146 where each work unit may represent one or more of the events related to a given data packet of a stream. As one example, a Work Unit (WU) is a container that is associated with a stream state and used to describe (i.e. point to) data within a stream (stored). For example, work units may dynamically originate within a peripheral unit coupled to the multi-processor system (e.g. injected by a networking unit, a host unit, or a solid state drive interface), or within a processor itself, in association with one or more streams of data, and terminate at another peripheral unit or another processor of the system. The work unit is associated with an amount of work that is relevant to the entity executing the work unit for processing a respective portion of a stream. In some examples, one or more processing cores of a DPU may be configured to execute program instructions using a work unit (WU) stack.

In some examples, in processing the plurality of events related to each data packet, a first one of the plurality of cores 140, e.g., core 140A may process a first event of the plurality of events. Moreover, first core 140A may provide to a second one of plurality of cores 140, e.g., core 140B a first work unit of the one or more work units. Furthermore, second core 140B may process a second event of the plurality of events in response to receiving the first work unit from first core 140B.

DPU 17 may act as a combination of a switch/router and a number of network interface cards. For example, networking unit 142 may be configured to receive one or more data packets from and transmit one or more data packets to one or more external devices, e.g., network devices. Networking unit 142 may perform network interface card functionality, packet switching, and the like, and may use large forwarding tables and offer programmability. Networking unit 142 may expose Ethernet ports for connectivity to a network, such as network 7 of FIG. 1. In this way, DPU 17 supports one or more high-speed network interfaces, e.g., Ethernet ports, without the need for a separate network interface card (NIC). Each of PCIe interfaces 146 may support one or more PCIe interfaces, e.g., PCIe ports, for connectivity to an application processor (e.g., an x86 processor of a server device or a local CPU or GPU of the device hosting DPU 17) or a storage device (e.g., an SSD). DPU 17 may also include one or more high bandwidth interfaces for connectivity to off-chip external memory (not illustrated in FIG. 2). Each of accelerators 148 may be configured to perform acceleration for various data-processing functions, such as look-ups, matrix multiplication, cryptography, compression, regular expressions, or the like. For example, accelerators 148 may comprise hardware implementations of look-up engines, matrix multipliers, cryptographic engines, compression engines, regular expression interpreters, or the like.

In accordance with the techniques of this disclosure, DPU 17 may dynamically reconfigure PCIe interfaces 146 (and host interfaces, also referred to as host unit interfaces) to operate in either endpoint mode or in root complex mode. In general, in root complex mode, PCIe interfaces 146 couple cores 140 and memory unit 134 to a switch fabric (e.g., a PCIe switch fabric) including one or more endpoint devices, such as storage units or other compute nodes, while in endpoint mode, PCIe interfaces 146 couple a root complex device to cores 140 and memory unit 134. For example, if a host unit couples DPU 17 to one of compute nodes 13, the host unit may be configured in endpoint mode to receive instructions (e.g., work units) to perform various processing tasks or to retrieve and provide data to the one of compute nodes 13. As another example, if a host unit couples DPU to one of storage nodes 12, the host unit may be configured in root complex mode to retrieve data from storage devices of the one of storage nodes 12.

Moreover, in some cases, a user, such as an administrator, may initially couple one of PCIe interfaces 146 to one of compute nodes 13, then swap the coupling to one of storage nodes 12. In accordance with the techniques of this disclosure, PCIe interfaces 146 may be dynamically reconfigured between endpoint mode and root complex mode, without requiring a restart of DPU 17 or any other PCIe interfaces 146. In particular, PCIe interfaces 146 may each include inputs for receiving reset signals (such as PERST# signals) to perform an endpoint reset according to, e.g., the PCIe standard. However, PCIe interfaces 146 are also coupled to respective I/O expanders 147, which multiplex the reset line from PCIe interfaces 146 to an outgoing reset line. In this manner, when PCIe interfaces 146 are configured in root complex mode, PCIe interfaces 146 may deliver data to I/O expanders 147 to cause I/O expanders 147 to send reset signals to endpoint devices. PCIe interfaces 146 may further include buffers (not shown in FIG. 2) to receive and mask the reset signals from I/O expanders 147, in some examples.

Memory controller 144 may control access to memory unit 134 by cores 140, networking unit 142, and any number of external devices, e.g., network devices, servers, external storage devices, or the like. Memory controller 144 may be configured to perform a number of operations to perform memory management in accordance with the present disclosure. For example, memory controller 144 may be capable of mapping accesses from one of the cores 140 to either of coherent cache memory 136 or non-coherent buffer memory 138. In some examples, memory controller 144 may map the accesses based on one or more of an address range, an instruction or an operation code within the instruction, a special access, or a combination thereof.

Additional details regarding the operation and advantages of the DPU are available in U.S. patent application Ser. No. 16/031,921, filed Jul. 10, 2018, and titled "DATA PROCESSING UNIT FOR COMPUTE NODES AND STORAGE NODES," and U.S. patent application Ser. No. 16/031,676, filed Jul. 10, 2018, and titled "ACCESS NODE FOR DATA CENTERS", the entire content of each of which is incorporated herein by reference.

Figure 3:
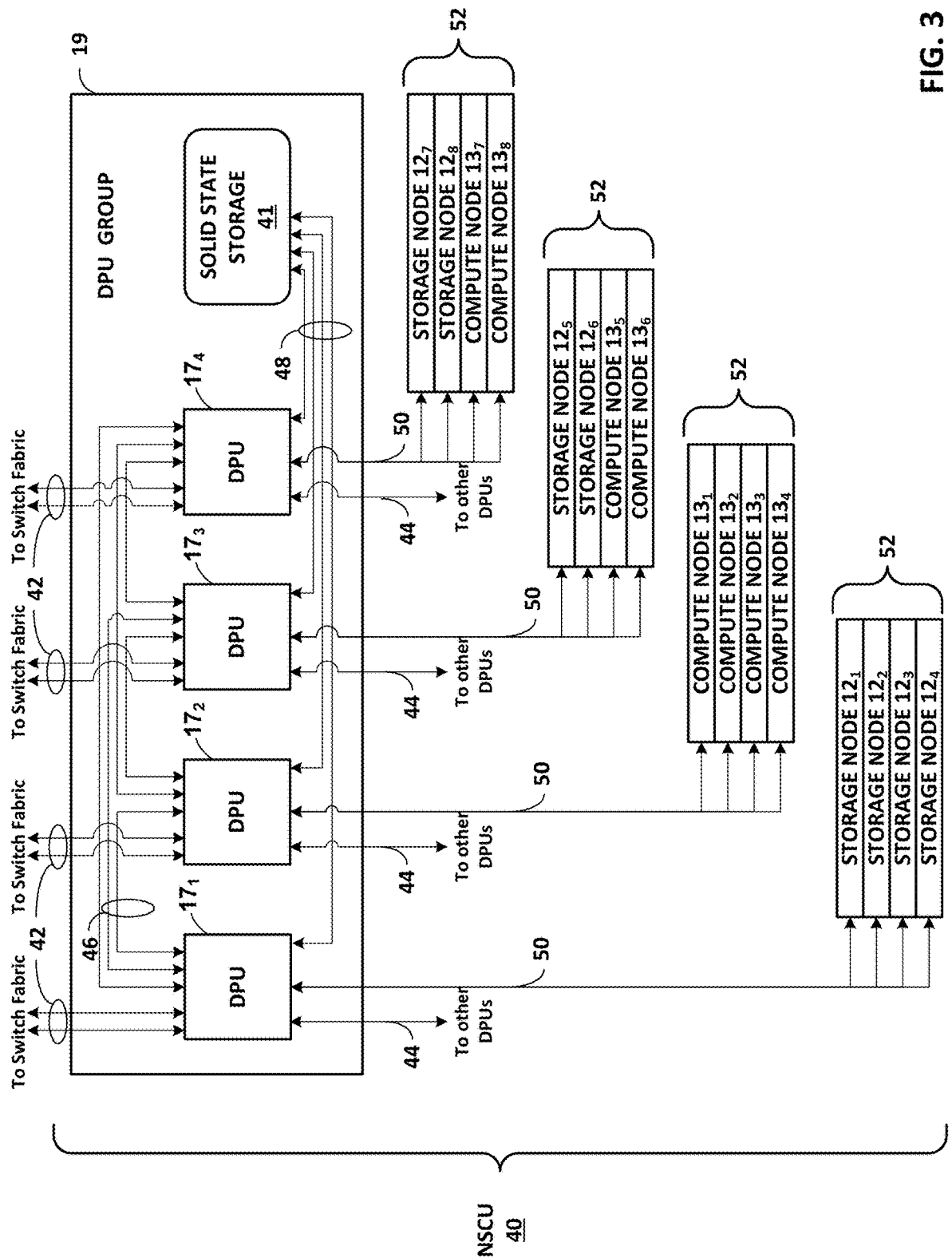
FIG. 3 is a block diagram illustrating one example of network storage compute unit (NSCU) including a DPU group and its supported servers.

FIG. 3 is a block diagram illustrating one example of network storage compute unit (NSCU) 40 including a DPU group 19 and its supported node group 52. DPU group 19 may be configured to operate as a high-performance I/O hub designed to aggregate and process network and storage I/O to multiple node groups 52. In the particular example of FIG.

3, DPU group 19 includes four DPUs $17_1$-$17_4$ (collectively, "DPUs 17") connected to a pool of local solid state storage 41. In the illustrated example, DPU group 19 supports a total of eight storage nodes $12_1$-$12_8$ (collectively, "storage nodes 12") and eight compute nodes $13_1$-$13_8$ (collectively, compute nodes 13) with each of the four DPUs 17 within DPU group 19 supporting four of storage nodes 12 and compute nodes 13. In some examples, each of the four storage nodes 12 and/or compute nodes 13 supported by each of the DPUs 17 may be arranged as a node group 52. In some examples, the "storage nodes 12" or "compute nodes 13" described throughout this application may be dual-socket or dual-processor "storage nodes" or "compute nodes" that are arranged in groups of two or more within a standalone device, e.g., node group 52. In the example of FIG. 3, a DPU supports four nodes of storage nodes 12 and/or compute nodes 13. The four nodes may be any combination of storage nodes 12 and/or compute nodes 13 (e.g., 4 storage nodes 12 and 0 compute nodes 13, 2 storage nodes 12 and 2 compute nodes 13, 1 storage node 12 and 3 compute nodes 13, 0 storage nodes 12 and 4 compute nodes 13, etc.).

Although DPU group 19 is illustrated in FIG. 3 as including four DPUs 17 that are all connected to a single pool of solid state storage 41, a DPU group may be arranged in other ways. In one example, each of the four DPUs 17 may be included on an individual DPU sled that also includes solid state storage and/or other types of storage for the DPU. In this example, a DPU group may include four DPU sleds each having a DPU and a set of local storage devices.

In one example implementation, DPUs 17 within DPU group 19 connect to node groups 52 and solid state storage 41 using Peripheral Component Interconnect express (PCIe) links 48, 50, and connect to other DPUs and the datacenter switch fabric 14 using Ethernet links 42, 44, 46. For example, each of DPUs 17 may support six high-speed Ethernet connections, including two externally-available Ethernet connections 42 for communicating with the switch fabric, one externally-available Ethernet connection 44 for communicating with other DPUs in other DPU groups, and three internal Ethernet connections 46 for communicating with other DPUs 17 in the same DPU group 19. In one example, each of externally-available connections 42 may be a 100 Gigabit Ethernet (GE) connection. In this example, DPU group 19 has 8×100 GE externally-available ports to connect to the switch fabric 14.

Within DPU group 19, connections 42 may be copper, i.e., electrical, links arranged as 8×25 GE links between each of DPUs 17 and optical ports of DPU group 19. Between DPU group 19 and the switch fabric, connections 42 may be optical Ethernet connections coupled to the optical ports of DPU group 19. The optical Ethernet connections may connect to one or more optical devices within the switch fabric, e.g., optical permutation devices described in more detail below. The optical Ethernet connections may support more bandwidth than electrical connections without increasing the number of cables in the switch fabric. For example, each optical cable coupled to DPU group 19 may carry 4×100 GE optical fibers with each fiber carrying optical signals at four different wavelengths or lambdas. In other examples, the externally-available connections 42 may remain as electrical Ethernet connections to the switch fabric.

The four remaining Ethernet connections supported by each of DPUs 17 include one Ethernet connection 44 for communication with other DPUs within other DPU groups, and three Ethernet connections 46 for communication with the other three DPUs within the same DPU group 19. In some examples, connections 44 may be referred to as "inter-DPU group links" and connections 46 may be referred to as "intra-DPU group links."

Ethernet connections 44, 46 provide full-mesh connectivity between DPUs within a given structural unit. In one example, such a structural unit may be referred to herein as a logical rack (e.g., a half-rack or a half physical rack) that includes two NSCUs 40 having two AGNs 19 and supports an 8-way mesh of eight DPUs 17 for those AGNs. In this particular example, connections 46 would provide full-mesh connectivity between the four DPUs 17 within the same DPU group 19, and connections 44 would provide full-mesh connectivity between each of DPUs 17 and four other DPUs within one other DPU group of the logical rack (i.e., structural unit). In addition, DPU group 19 may have enough, e.g., sixteen, externally-available Ethernet ports to connect to the four DPUs in the other DPU group.

In the case of an 8-way mesh of DPUs, i.e., a logical rack of two NSCUs 40, each of DPUs 17 may be connected to each of the other seven DPUs by a 50 GE connection. For example, each of connections 46 between the four DPUs 17 within the same DPU group 19 may be a 50 GE connection arranged as 2×25 GE links. Each of connections 44 between the four DPUs 17 and the four DPUs in the other DPU group may include four 50 GE links. In some examples, each of the four 50 GE links may be arranged as 2×25 GE links such that each of connections 44 includes 8×25 GE links to the other DPUs in the other DPU group.

In another example, Ethernet connections 44, 46 provide full-mesh connectivity between DPUs within a given structural unit that is a full-rack or a full physical rack that includes four NSCUs 40 having four AGNs 19 and supports a 16-way mesh of DPUs 17 for those AGNs. In this example, connections 46 provide full-mesh connectivity between the four DPUs 17 within the same DPU group 19, and connections 44 provide full-mesh connectivity between each of DPUs 17 and twelve other DPUs within three other DPU group. In addition, DPU group 19 may have enough, e.g., forty-eight, externally-available Ethernet ports to connect to the four DPUs in the other DPU group.

In the case of a 16-way mesh of DPUs, each of DPUs 17 may be connected to each of the other fifteen DPUs by a 25 GE connection, for example. In other words, in this example, each of connections 46 between the four DPUs 17 within the same DPU group 19 may be a single 25 GE link. Each of connections 44 between the four DPUs 17 and the twelve other DPUs in the three other DPU groups may include 12×25 GE links.

As shown in FIG. 3, each of DPUs 17 within a DPU group 19 may also support a set of high-speed PCIe connections 48, 50, e.g., PCIe Gen 3.0 or PCIe Gen 4.0 connections, for communication with solid state storage 41 within DPU group 19 and communication with node groups 52 within NSCU 40. Each of node groups 52 includes four storage nodes 12 and/or compute nodes 13 supported by one of DPUs 17 within DPU group 19. Solid state storage 41 may be a pool of Non-Volatile Memory express (NVMe)-based solid state drive (SSD) storage devices accessible by each of DPUs 17 via connections 48.

In one example, solid state storage 41 may include twenty-four SSD devices with six SSD devices for each of DPUs 17. The twenty-four SSD devices may be arranged in four rows of six SSD devices with each row of SSD devices being connected to one of DPUs 17. Each of the SSD devices may provide up to 16 Terabytes (TB) of storage for a total of 384 TB per DPU group 19. As described in more detail below, in some cases, a physical rack may include four DPU groups 19 and their supported node groups 52. In that case, a typical physical rack may support approximately 1.5 Petabytes (PB) of local solid state storage. In another example, solid state storage 41 may include up to 32 U.2×4 SSD devices. In other examples, NSCU 40 may support other SSD devices, e.g., 2.5" Serial ATA (SATA) SSDs, mini-SATA (mSATA) SSDs, M.2 SSDs, and the like.

In the above described example in which each of the DPUs 17 is included on an individual DPU sled with local storage for the DPU, each of the DPU sleds may include four SSD devices and some additional storage that may be hard drive or solid state drive devices. In this example, the four SSD devices and the additional storage may provide approximately the same amount of storage per DPU as the six SSD devices described in the previous example.

In one example, each of DPUs 17 supports a total of 96 PCIe lanes. In this example, each of connections 48 may be an 8×4-lane PCI Gen 3.0 connection via which each of DPUs 17 may communicate with up to eight SSD devices within solid state storage 41. In addition, each of connections 50 between a given DPU 17 and the four storage nodes 12 and/or compute nodes 13 within the node group 52 supported by the DPU 17 may be a 4×16-lane PCIe Gen 3.0 connection. In this example, DPU group 19 has a total of 256 external facing PCIe links that interface with node groups 52. In some scenarios, DPUs 17 may support redundant server connectivity such that each of DPUs 17 connects to eight storage nodes 12 and/or compute nodes 13 within two different node groups 52 using an 8×8-lane PCIe Gen 3.0 connection.

In another example, each of DPUs 17 supports a total of 64 PCIe lanes. In this example, each of connections 48 may be an 8×4-lane PCI Gen 3.0 connection via which each of DPUs 17 may communicate with up to eight SSD devices within solid state storage 41. In addition, each of connections 50 between a given DPU 17 and the four storage nodes 12 and/or compute nodes 13 within the node group 52 supported by the DPU 17 may be a 4×8-lane PCIe Gen 4.0 connection. In this example, DPU group 19 has a total of 128 external facing PCIe links that interface with node groups 52.

Figure 4:
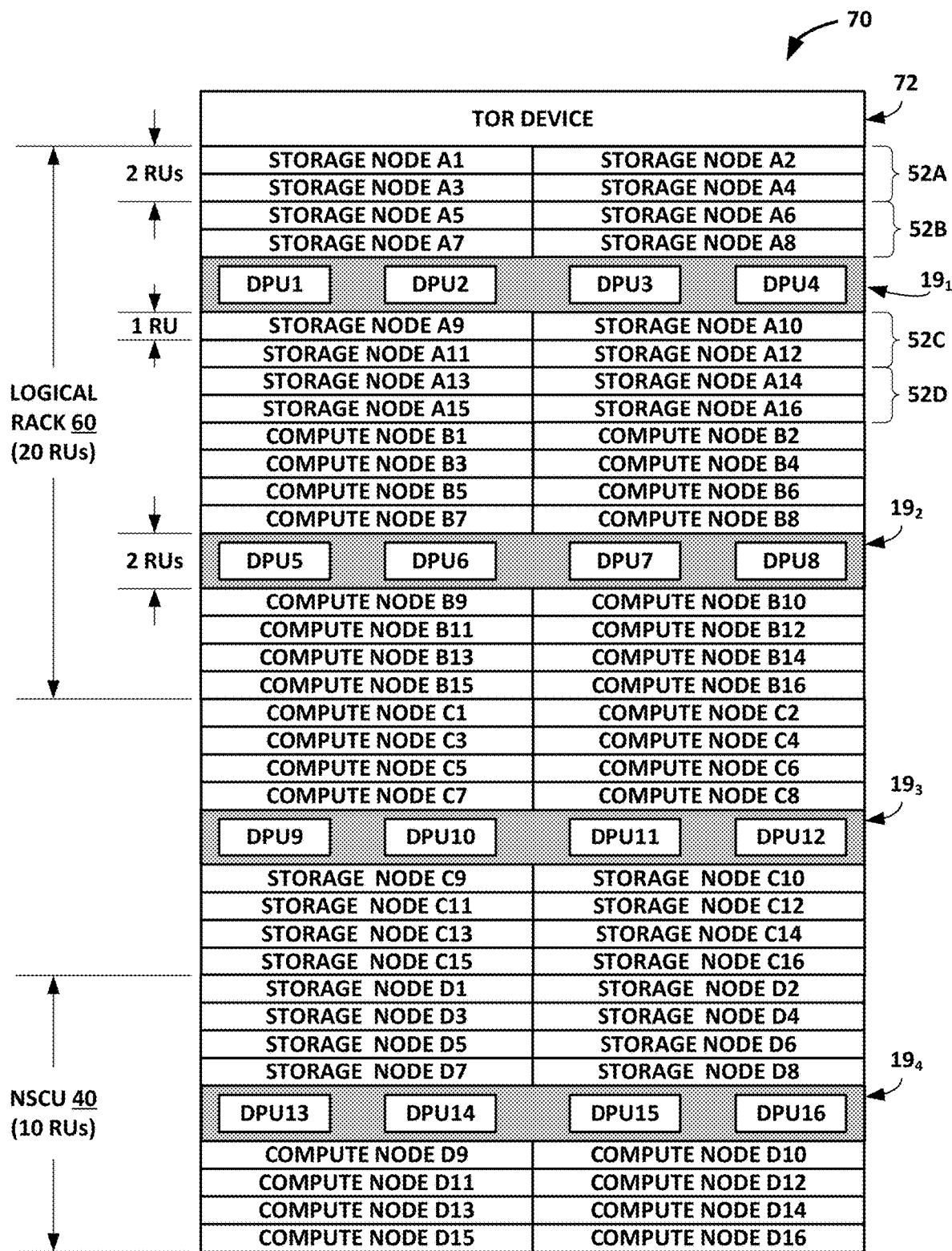
FIG. 4 is a block diagram illustrating an example arrangement of a full physical rack including two logical racks.

FIG. 4 is a block diagram illustrating an example arrangement of a full physical rack 70 including two logical racks 60. In the illustrated example of FIG. 4, rack 70 has 42 rack units or slots in vertical height including a 2 rack unit (2RU) top of rack (TOR) device 72 for providing connectivity to devices within switch fabric 14. In one example, TOR device 72 comprises a top of rack Ethernet switch. In other examples, TOR device 72 comprises an optical permutor described in further detail below. In some examples, rack 70 may not include an additional TOR device 72 and instead have the typical 40 rack units.

In the illustrated example, rack 70 includes four DPU groups $19_1$-$19_4$ that are each separate network appliances 2RU in height. Each of the DPU groups 19 includes four DPUs and may be configured as shown in the example of FIG. 3. For example, DPU group $19_1$ includes DPUs DPU1-DPU4, DPU group $19_2$ includes DPUs DPU5-DPU8, DPU group $19_3$ includes DPUs DPU9-DPU12, and DPU group $19_4$ includes DPUs DPU13-DPU16. DPUs DPU1-DPU16 may be substantially similar to DPUs 17 described above.

Further, rack 70 includes a plurality of storage trays. Each storage tray includes an electrical backplane configured to provide an interface between DPU 17 and one or more storage nodes 12 and compute nodes 13. Further, each storage tray may provide power and physical support to one or more storage nodes 12 and compute nodes 13.

In this example, each of the DPU groups 19 supports sixteen storage nodes and/or compute nodes. For example, DPU group $19_1$ supports storage nodes A1-A16, DPU group $19_2$ supports compute nodes B1-B16, DPU group $19_3$ supports compute nodes C1-C8 and storage nodes C9-C16, and DPU group $19_4$ supports storage nodes D1, D3, D6-D12 and compute nodes D2, D4, D5, and D13-D16. Each storage node or compute node may be a dual-socket or dual-processor server sled that is ½Rack in width and 1RU in height. In some examples, four of the storage nodes or compute nodes may be arranged into a node group 52 that is 2RU in height. For example, node group 52A includes storage nodes A1-A4, node group 52B includes storage nodes A5-A8, node group 52C includes storage nodes A9-A12, and storage group 52D includes storage nodes A13-A16. Nodes B1-B16, C1-C16, and D1-D16 may be similarly arranged into node groups 52.

DPU groups 19 and node groups 52 are arranged into NSCUs 40 from FIGS. 3-4. NSCUs 40 are 10RU in height and each include one 2RU DPU group 19 and four 2RU node groups 52. As illustrated in FIG. 4, DPU groups 19 and node groups 52 may be structured as a compute sandwich, in which each DPU group 19 is "sandwiched" between two node groups 52 on the top and two node groups 52 on the bottom. For example, with respect to DPU group $19_1$, node group 52A may be referred to as a top second server, node group 52B may be referred to as a top server, node group 52C may be referred to as a bottom server, and node group 52D may be referred to as a bottom second server. In the illustrated structural arrangement, DPU groups 19 are separated by eight rack units to accommodate the bottom two 2RU node groups 52 supported by one DPU group and the top two 2RU node groups 52 supported by another DPU group.

NSCUs 40 may be arranged into logical racks 60, i.e., half physical racks. Logical racks 60 are 20RU in height and each include two NSCUs 40 having full mesh connectivity. In the illustrated example of FIG. 4, DPU group $19_1$ and DPU group $19_2$ are included in the same logical rack 60 along with their respective supported storage and compute nodes A1-A16 and B1-B16. In some examples, DPUs DPU1-DPU8 included the same logical rack 60 are connected to each other in an 8-way mesh. DPUs DPU9-DPU16 may be similarly connected in an 8-way mesh within another logical rack 60 includes DPUs groups $19_3$ and $19_4$ along with their respective storage and compute nodes C1-C16 and D1-D16.

Logical racks 60 within rack 70 may be connected to the switch fabric directly or through an intermediate top of rack device 72. As noted above, in one example, TOR device 72 comprises a top of rack Ethernet switch. In other examples, TOR device 72 comprises an optical permutor that transports optical signals between DPUs 17 and core switches 22 and that is configured such that optical communications are "permuted" based on wavelength so as to provide full-mesh connectivity between the upstream and downstream ports without any optical interference.

In the illustrated example, each of the DPU groups 19 may connect to TOR device 72 via one or more of the 8×100 GE links supported by the DPU group to reach the switch fabric. In one case, the two logical racks 60 within rack 70 may each connect to one or more ports of TOR device 72, and TOR device 72 may also receive signals from one or more logical racks within neighboring physical racks. In other examples, rack 70 may not itself include TOR device 72, but instead logical racks 60 may connect to one or more TOR devices included in one or more neighboring physical racks.

For a standard rack size of 40RU it may be desirable to stay within a typical power limit, such as a 15 kilowatt (kW) power limit. In the example of rack 70, not taking the additional 2RU TOR device 72 into consideration, it may be possible to readily stay within or near the 15 kW power limit even with the sixty-four storage nodes and compute nodes and the four DPU groups. For example, each of the DPU groups 19 may use approximately 1 kW of power resulting in approximately 4 kW of power for DPU groups. In addition, each of the storage nodes and compute nodes may use approximately 200 W of power resulting in around 12.8 kW of power for node groups 52. In this example, the 40RU arrangement of DPU groups 19 and node groups 52, therefore, uses around 16.8 kW of power.

In accordance with the techniques of this disclosure, in some examples, DPUs of DPU groups 19 may be dynamically re-coupled to various server nodes of servers 52. For instance, DPU 9 of DPU group 193 may be coupled to compute node C7, then swapped to storage node C9 without resetting DPU 9. In particular, a host unit interface of DPU 9 may be dynamically reconfigured from endpoint mode to root complex mode in accordance with the techniques of this disclosure in response to such re-coupling.

Figure 5:
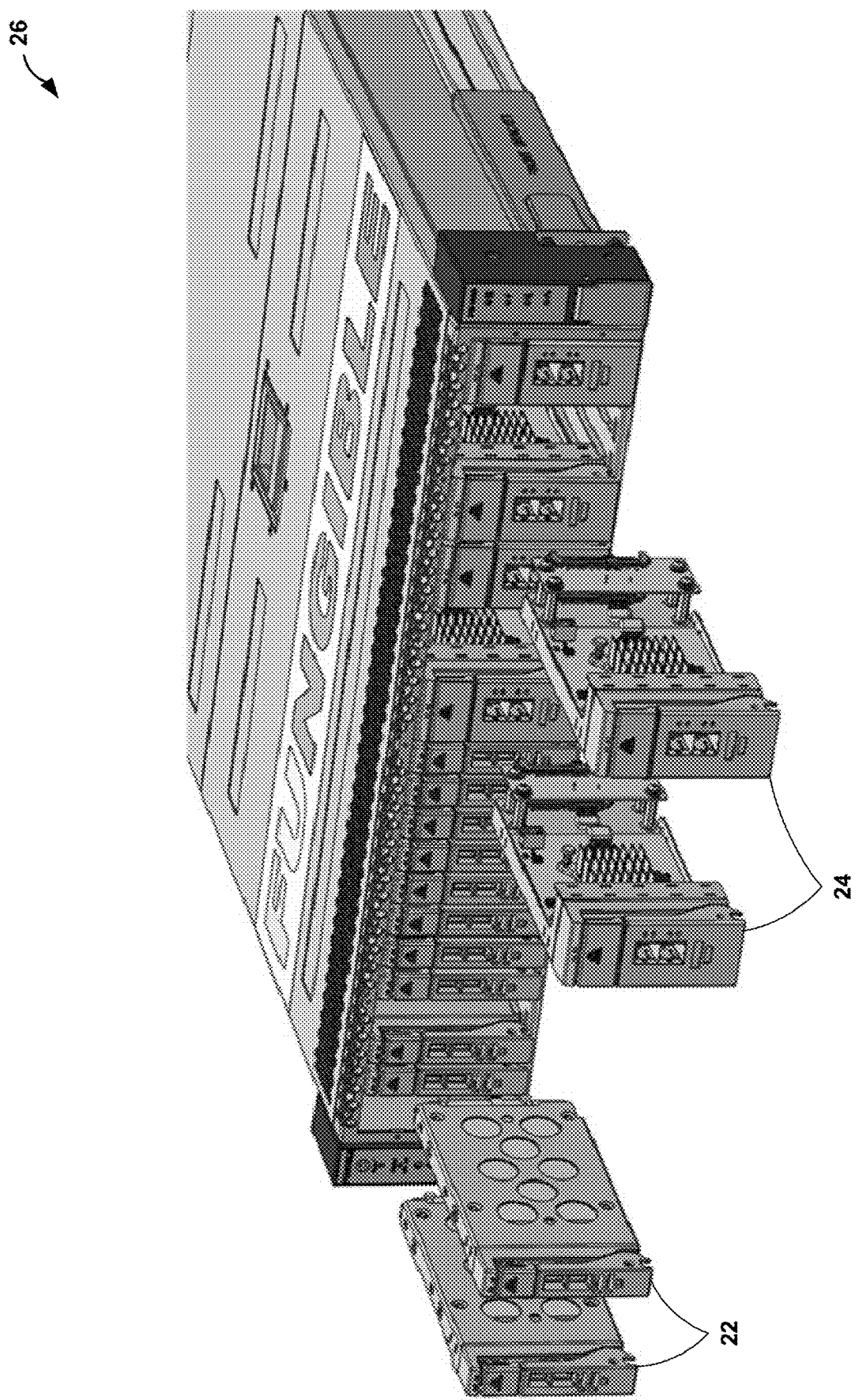
FIG. 5 is a conceptual diagram illustrating an example server rack that includes a plurality of storage devices and I/O expansion devices in accordance with the techniques of the disclosure.

FIG. 5 is a conceptual diagram illustrating an example storage tray 26 that includes a plurality of storage devices 22 and example removeable expansion devices 24 in accordance with the techniques of the disclosure. Storage tray 26 may be an example implementation of one of storage nodes $12_1$-$12_8$ or compute nodes $13_1$-$13_8$ of FIG. 3, or storage nodes A1-A16, C9-C16, and D1-D8 or compute nodes B1-B16, C1-C8, and D9-D16 of FIG. 4.

In some examples, storage tray 26 includes a combination of one or more removable storage devices 22 and one or more removeable expansion devices 24 (also referred to herein as I/O expansion devices or I/O expanders). In further examples, storage tray 26 includes only storage devices 22. In still further examples, storage tray 26 includes only removeable expansion devices 24. Storage tray 26 provides a plurality of slots for mechanically seating and supporting storage devices 22 and removeable expansion devices 24.

Storage tray 26 further provides an electrical backplane comprising a plurality of interfaces for electrically interfacing with each of storage devices 22 and removeable expansion devices 24. In one example, the electrical backplane comprises a plurality of PCIe connectors that interface with each of storage devices 22 and removeable expansion devices 24 to connect storage devices 22 and removeable expansion devices 24 to one or more high-speed PCIe lanes.

Storage devices 22 may be one or more storage media for data storage. In some examples, each storage device 22 is a solid-state drive (SSD) storage device. In some examples, each storage device 22 is a 3.5" drive that conforms to SFF-8300 and SFF-8301 as incorporated into the EIA-740 specification by the Electronic Industries Association (EIA). In some examples, storage device 22 comprises flash memory. Each of storage devices 22 comprises a rear plate including an electrical connector mounted thereon for interfacing with the backplane of storage tray 26. In some examples, the electrical connector comprises a single SFF-8639 (U.2) form factor connector. In some examples, the electrical connector interfaces with up to four PCIe lanes of the electrical backplane.

In accordance with the techniques of the disclosure, a DPU (not shown in FIG. 5) may be communicatively coupled to storage devices 22 or compute devices of storage tray 26 via one of removeable expansion devices 24, e.g., as shown in FIG. 4. In particular, the DPU may cause one of removeable expansion devices 24 to issue a reset signal to one of storage devices 22, in order to connect to the one of storage devices 22 in endpoint mode (while a host unit interface of the DPU is configured in root complex mode). Furthermore, the DPU may initially configure the host unit interface to operate in endpoint mode, then reconfigure the host unit interface to operate in root complex mode, which may prompt the DPU to cause the one of removeable expansion devices 24 to issue the reset signal. Likewise, the host unit interface may be recoupled to a different device, such as a different one of storage devices 22 or to a compute device of storage tray 26. The DPU may use the techniques of this disclosure to dynamically reconfigure the host unit interface between endpoint mode and root complex mode without restarting the DPU. In this manner, the DPU may avoid downtime, thereby preventing loss of productive time for storage tray 26.

In the example of FIG. 5, each of the removeable expansion devices 24 includes a front plate comprising an aggregate electrical storage connector mounted thereon. The aggregate electrical storage connector is configured to interface with one or more storage devices and computing devices (not depicted). Each of removeable expansion devices 24 further comprises a rear plate comprising a plurality of backplane electrical connectors mounted thereon, wherein the plurality of backplane electrical connectors are configured to interface with the electrical backplane of storage tray 26. In some examples, each of removeable expansion devices 24 is the size of two side-by-side 3.5" drives that conform to SFF-8300 and SFF-8301 as incorporated into the EIA-740 specification by the Electronic Industries Association (EIA). In some examples, the plurality of backplane electrical connectors comprise two SFF-8639 (U.2) form factor connectors configured to interface with up to eight PCIe lanes of the electrical backplane of storage tray 26. In accordance with the techniques of the disclosure, expansion device 26 is configured to present, via the plurality of backplane electrical connectors, an aggregate bandwidth of the plurality of high-speed PCIe lanes of the electrical backplane to storage and computing devices interfaced with the aggregate electrical storage connector.

Figure 6:
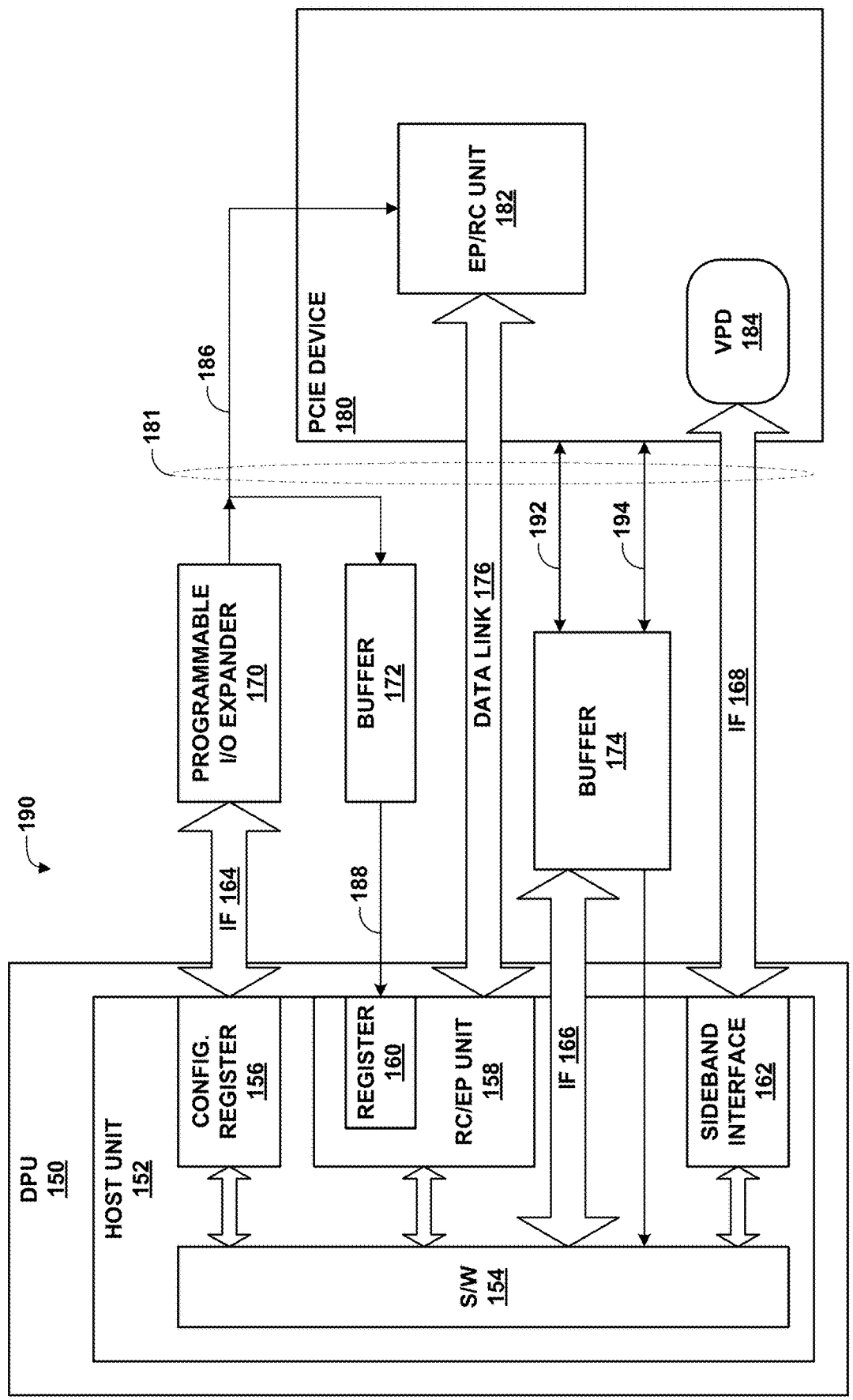
FIG. 6 is a block diagram illustrating an example system including a DPU and a programmable input/output (I/O) expander.

FIG. 6 is a block diagram illustrating an example system 190 including DPU 150 and programmable input/output (I/O) expander 170. As shown in this example, DPU 150 presents a PCI Express (PCIe) interface 181 that allows DPU 150 to communicate via a PCIe I/O tree with other device, such as PCIe device 180. As described herein, host unit 152 is, in this example, a PCI Express (PCIe) interface that can be dynamically configured to operate in either root complex mode or endpoint mode of the PCIe input/output tree. In root complex mode, host unit 152 is configured to provide root complex functionality to connect DPU 150 to one or more endpoint devices, such as PCIe device 180. In endpoint mode, host unit 152 allows DPU 150 to act as an endpoint device on the PCIe I/O tree in which another device, such as PCIe device 180, is configured to operate as a root complex for the PCIe I/O tree. In accordance with the techniques of this disclosure, DPU 150 may dynamically reconfigure host unit 152 in either endpoint mode or root complex mode without requiring reboot of DPU 150 or full reinitialization of the PCIe I/O tree. Any or all of DPUs 17 of FIGS. 1-3 may include elements similar to those of DPU 150 of FIG. 6.

In the example of FIG. 6, system 190 also includes buffer 172 and buffer 174, which are shown external to DPU 150 in this example. DPU 150 includes host unit 152, which together with programmable I/O expander 170, provides a host unit interface to PCIe device 180. In accordance with the techniques of this disclosure, host unit 152 may be configured to operate in either root complex mode or endpoint mode dynamically, e.g., without requiring a restart of DPU 150. Although shown separately, I/O expander 170, buffers 170, 174 may be integrated within DPU 150.

In the example of FIG. 6, host unit 152 operates as a PCIe controller and includes configuration (config.) register 156, root complex/endpoint (RC/EP) unit 158, and sideband interface 162. RC/EP unit 158 further includes register 160. Host unit 152 may be implemented within DPU 150 or separately using circuitry, e.g., as hardware-based logic, which may include one or more circuit components, microprocessors, digital signal processors (DSPs), application specific integrated circuits (ASICs), field programmable gate arrays (FPGAs), or any other equivalent integrated or digital logic circuitry, as well as any combinations of such components. Moreover, as a PCIe controller, host unit 152 executes instructions of software (S/W) 154 that configures and controls operation of host unit 152 in conformance with the requirements of PCIe.

In general, PCIe device 180 represents any device configured to connect and communication via PCIe interface 181. For example, PCIe device 180 may be a compute node, a storage node, an I/O board of a node or any other device having a PCIe interface. For purposes of example, PCIe device 180 is shown generally to include an Endpoint/Root Complex (EP/RC) unit 182 representing circuitry for operating in one of the Endpoint or Root Complex modes required by the PCIe protocol and vital product data (VPD) 184 representing various configuration and informational data associated with PCIe device 180, such as whether PCIe device 180 operates in root complex mode or endpoint mode.

As shown in FIG. 6, configuration register 156 and programmable I/O expander 170 are coupled by interface (IF) 164, buffer 172 and register 160 are communicatively coupled, data link 176 couples RC/EP unit 158 and EP/RC unit 182, host unit 152 and buffer 174 are coupled by interface 166, and sideband interface 162 and PCIe device 180 are coupled by IF 168. Collectively, root complex reset line 186, data link 176, interface 166, interface 168, and the various other coupling lines shown in FIG. 6 may form PCIe interface 181, e.g., a physical cable or bus conforming to the PCIe standard, which may include a number of lines.

According to the PCIe standard, a PCIe interface includes a number of present lines (PRSNT#) and a reset line (PERST#). In particular, according to the PCIe standard, the PERST# line carries a reset signal from a device in root complex mode to a device in endpoint mode. However, in accordance with the techniques of this disclosure, programmable I/O expander 170 effectively multiplexes two reset lines into one, e.g., the PERST# line of PCIe. In particular, programmable I/O expander 170 multiplexes root complex reset line 186 with endpoint reset line 188. In this manner, host unit 152 may receive a reset signal via endpoint reset line 188 at register 160, or configuration may send data from configuration register 156 to programmable I/O expander 170 via interface 164 to cause programmable I/O expander 170 to issue a reset signal via root complex reset line 186. In this manner, host unit 152 may configure the host unit interface of DPU 150 to operate in either endpoint mode or in root complex mode.

As described herein, host unit 152 may be dynamically reconfigured to operate in either endpoint mode or in root complex mode without triggering a reset of DPU 150. When host unit 152 is configured to operate in root complex mode, host unit 152 sends data to programmable I/O expander 170 to issue a reset signal (e.g., a RC_PERST#) via root complex reset line 186. Buffer 172 may also receive the root complex reset signal, and delay or prevent transmission of the reset signal to register 160 when host unit 152 is configured to operate in root complex mode. In this manner, buffer 172 provides isolation from root complex reset line 186. When host unit 152 is configured to operate in endpoint mode, host unit 152 receives a reset signal via endpoint reset line 188 at register 160. Host unit 152 may execute software 154 to determine whether to operate in root complex mode or endpoint mode, and how to be configured accordingly.

Host unit 152 may be configured to operate in EP mode at power up, after a cold reboot, if PCIe device 180 only supports root complex mode, or at the detection of a status change on present-lines 192 (regardless of configuration mode prior to the change in status). After host unit 152 has been configured to operate in endpoint mode, upon detecting an endpoint reset signal via endpoint reset line 188, host unit 152 and PCIe device 180 may perform a conventional endpoint to root complex negotiation and endpoint initialization procedure, e.g., according to the PCIe standard. In this example, PCIe device 180 would operate in root complex mode. In some examples, after determining that host unit 152 is to be configured in endpoint mode, host unit 152 may retrieve VPD 184 via IF 168 and sideband interface 162 to confirm that host unit 152 is indeed to operate in endpoint mode.

On the other hand, in some examples, host unit 152 may execute software 154 and determine that host unit 152 is to be configured in root complex mode. In response to this determination, host unit 152 may reconfigure itself to operate in root complex mode from endpoint mode, and then send data via interface 164 to programmable I/O expander 170 to cause programmable I/O expander 170 to issue a reset signal (e.g., RC_PERST#) to PCIe device 180 via root complex reset line 186.

As shown in FIG. 6 and discussed above, software 154 may be configured to cause host unit 152 and programmable I/O expander 170 to use independent paths for root complex reset signals and endpoint reset signals, e.g., root complex reset line 186 and endpoint reset line 188. Programmable I/O expander 170 may issue a root complex reset signal to multiple remote endpoint devices coupled to PCIe device 180, e.g., as shown in FIG. 5. The root complex reset signal may be drive to a link mating interface coupled to the remote endpoint devices. As discussed above, buffer 172 provides isolation between root complex reset line 186 and endpoint reset line 188. In some examples, buffer 172 may further provide a mechanism for masking a root complex reset signal when host unit 152 is to operate in root complex mode, to prevent triggering a reset through reception of a reset signal at register 160. Additionally or alternatively, host unit 152 may be configured to ignore reset signals received at register 160 when host unit 152 is configured to operate in root complex mode and without detecting a change in status at present-lines 192 (e.g., PRSNT# of PCIe).

As noted above, a host unit interface of host unit 152 may be a PCIe interface. The techniques of this disclosure are consistent with PCIe hot plug, hot removal, surprise insertion, and surprise removal. In some examples, WAKE# signal line 194 may be connected from a PCIe mating connector of PCIe device 180 to host unit 152 via buffer 174 when host unit 152 is configured to operate in root complex mode. This would allow a device of PCIe device 180 to force host unit 152 to re-issue a root complex reset signal via root complex reset line 186, to re-trigger a PCIe link to bring up and re-enumeration cycle. This may resolve various hot plug issues of PCIe. WAKE# signal line 194 connection scheme may also enable host unit 152 in endpoint mode to issue a WAKE# signal to a remote root complex controller (e.g., of PCIe device 180) to re-trigger an endpoint reset signal via endpoint reset line 188 and PCIe link enumeration cycles. This scheme may, once again, resolve hot plug events while interfacing host unit 152 in endpoint mode to a remote root complex PCIe controller of PCIe device 180.

Figure 7:
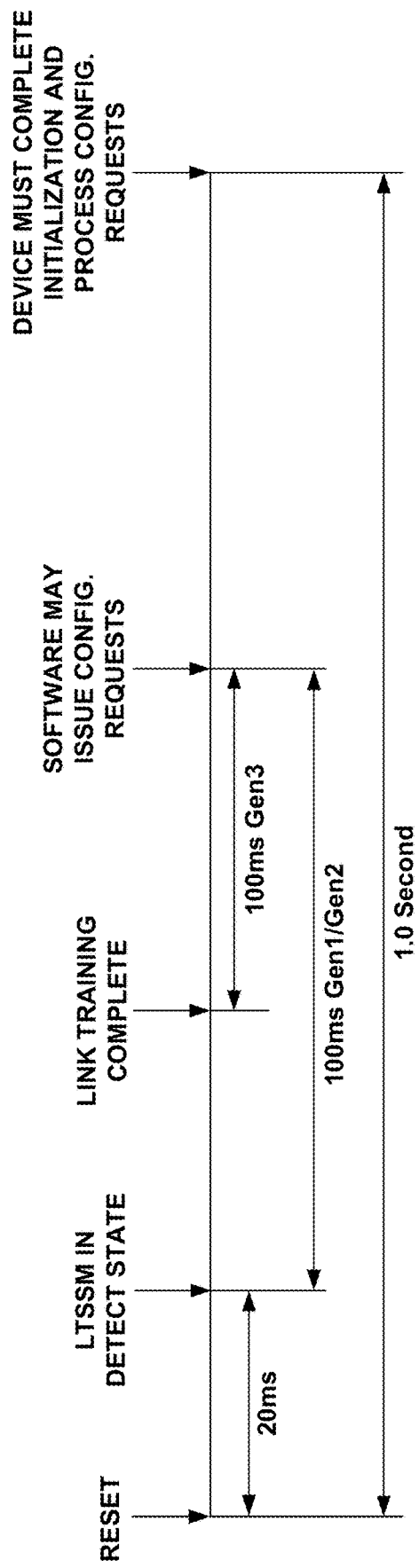
FIG. 7 is a conceptual diagram illustrating an example PCIe link initialization timing sequence while in endpoint mode.

FIG. 7 is a conceptual diagram illustrating an example PCIe link initialization timing sequence while in endpoint mode. When host unit 152 (FIG. 6) reverts from root complex to endpoint mode per the techniques of this disclosure, host unit 152 may advantageously meet the PCIe link initialization timing sequence according to the PCIe specification without requiring reboot. For root complex mode, host unit 152 has the flexibility to time the link initialization sequence. In the example of FIG. 7, the timing sequence is as follows. After a reset (e.g., endpoint reset signal), a link training and status state machine (LTSSM) may be in a "detect" state within 20 ms. After the LTSSM is in the detect state, link training completes within 100 ms, after which host unit 152 may execute software 152 to issue configuration requests. Within one second of the reset signal, host unit 152 is to complete initialization and process any configuration requests.

Conventional techniques support static configurations for host ASIC PCIe controllers to be programmed either in root complex mode or endpoint mode by design. The techniques of this disclosure support these schemes, but also offer dynamic reconfiguration in addition. Some recent advances allow host ASIC PCIe controls to support either root complex mode or endpoint mode, but this still requires static configuration based on boot time settings. These prior techniques require system designers to adopt a hard-wired logic for each platform, or to use logic design at boot time to make a selection. Conventional techniques do not provide for changing from root complex mode to endpoint mode connections gracefully and dynamically.

As discussed above, the techniques of this disclosure allow host unit 152 to support PCIe hot plug, hot removal, surprise insertion, and surprise removal cases. Thus, host unit 152 may allow switching between remote endpoint and remote root complex connections seamlessly and on the fly. With new applications designed with external cabling use cases, there are no conventional, existing solutions to adapt to both root complex and endpoint remote device connections on the fly and without changes to the host system. The techniques of this disclosure therefore solve the various problems of conventional techniques, giving the ability to adapt PCIe controller mode to a device whose mode is not known until a host system detects the presence of the device. Likewise, these techniques allow host unit 152 to connect to both types of remote PCIe controllers on the fly, which enables DPU 150 to support a wide range of applications.

Figure 8:
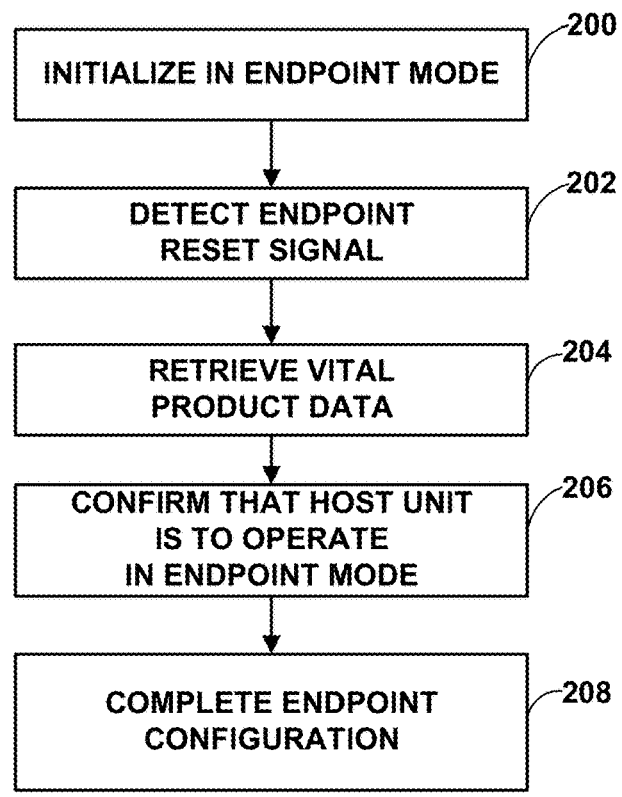
FIG. 8 is a flowchart illustrating an example method for configuring a host unit to operate in endpoint mode in accordance with the techniques of this disclosure.

FIG. 8 is a flowchart illustrating an example method for configuring host unit 152 to operate in endpoint mode in accordance with the techniques of this disclosure. Host unit 152 initializes in endpoint mode (200), e.g., at power up, after a cold reboot, or at detection of a status change in present-lines 192. It should be understood that a detection of a status change in present-lines 192 may be after an administrator or other disconnects an interface cable or other host unit interface element from one I/O board and reconnects the interface cable or other interface element to another, different I/O board. The previous I/O board may have been operating in root complex mode or in endpoint mode, such that host unit 152 may have been previously configured in either endpoint mode or in root complex mode. Regardless of the previous mode configuration, following a status change in present-lines 192, host unit 152 may initialize in endpoint mode.

After initializing in endpoint mode, host unit 152 detects an endpoint reset signal at register 160 via endpoint reset line 188 (202). In this example, host unit 152 has been configured (e.g., via software 154) to operate in endpoint mode, and therefore, the endpoint reset signal prompts host unit 152 to perform a reset in accordance with conventional endpoint mode reset procedures. For example, the conventional endpoint mode reset procedures may be defined according to the PCIe standard.

In this example, following detection of the endpoint reset signal, host unit 152 retrieves vital product data 184 (204) from PCIe device 180 via interface 168 and sideband interface 162. Host unit 152 executes software 154 to analyze the retrieved vital product data to confirm that host unit 152 should be operating in endpoint mode (206). Finally, host unit 152 completes the endpoint mode configuration (208). Although not shown in FIG. 8, RC/EP unit 158 of host unit 152 may then begin exchanging data with EP/RC unit 182 of PCIe device 180 via data link 176.

Figure 9:
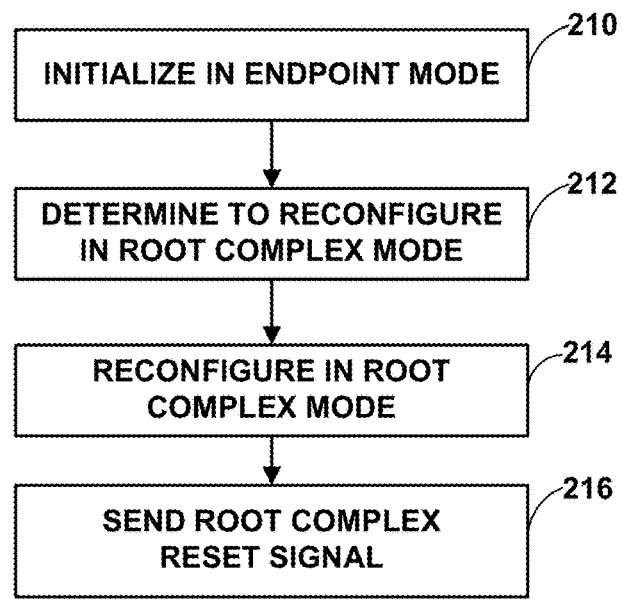
FIG. 9 is a flowchart illustrating an example method for configuring a host unit to operate in root complex mode in accordance with the techniques of this disclosure.

FIG. 9 is a flowchart illustrating an example method for configuring host unit 152 to operate in root complex mode in accordance with the techniques of this disclosure. Host unit 152 initializes in endpoint mode (210), e.g., at power up, after a cold reboot, or at detection of a status change in present-lines 192. Again, it should be understood that a detection of a status change in present-lines 192 may be after an administrator or other disconnects an interface cable or other host unit interface element from one I/O board and reconnects the interface cable or other interface element to another, different I/O board, without necessarily resetting DPU 150. The previous I/O board may have been operating in root complex mode or in endpoint mode, such that host unit 152 may have been previously configured in either endpoint mode or in root complex mode. Regardless of the previous mode configuration, following a status change in present-lines 192, host unit 152 may initialize in endpoint mode.

In this example, host unit 152 determines that it is to reconfigure in root complex mode (212). For example, host unit 152 may execute software 154 and determine that host unit 152 is to be configured in root complex mode. Accordingly, in response, host unit 152 reconfigures itself to operate in root complex mode (214). For example, through execution of software 154, host unit 152 may store configuration data to configuration register 156 indicating that host unit 152 is configured in root complex mode, as well as data indicating that a reset signal is to be sent to PCIe device 180.

Host unit 152 then sends a root complex reset signal (216) to PCIe device 180. In particular, host unit 152 sends data of configuration register 156 to programmable I/O expander 170 that instructs programmable I/O expander 170 to send a root complex reset signal to PCIe device 180 via root complex reset line 186. Because programmable I/O expander 170 multiplexes root complex reset line 186 with the input to buffer 172, buffer 172 also receives the root complex reset signal as if it were an endpoint reset signal. However, buffer 172 may avoid delivering the root complex reset signal to register 160, and/or host unit 152 may be configured to disregard reset signals received at register 160 when host unit 152 is configured to operate in root complex mode. The root complex reset signal may prompt PCIe device 180 to perform a reset procedure for one or more connected endpoint devices, e.g., according to the PCIe standard.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or digital logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method comprising:
    initially configuring a host unit interface of a data processing unit to operate in endpoint mode for a serial input/output (I/O) connection, wherein the host unit interface is communicatively coupled to a second device via the serial I/O connection;
    determining that the host unit interface of the data processing unit is to switch from operating in the endpoint mode to root complex mode for the serial I/O connection;
    in response to determining that the host unit interface is to switch from operating in the endpoint mode to the root complex mode for the serial I/O connection:
        configuring the host unit interface to operate in the root complex mode for the serial I/O connection; and
        sending data to an I/O expander unit to cause the I/O expander unit to issue a reset signal to the second device, the second device being configured to operate in the endpoint mode for the serial I/O connection.

2. The method of claim 1, wherein the serial I/O connection comprises PCI Express (PCIe) and the host unit interface comprises a PCIe interface.

3. The method of claim 1, wherein the I/O expander unit multiplexes a reset line to second device with a reset line to the host unit interface, and wherein sending the data to the I/O expander unit comprises sending the data to cause the I/O expander unit to issue the reset signal on the reset line to the second device.

4. The method of claim 1, wherein initially configuring the host unit interface comprises initially configuring the host unit interface to operate in the endpoint mode at power up, after a cold reboot, or at detection of a status change of one or more present-lines of the host unit interface.

5. The method of claim 1, wherein the second device comprises a first I/O board, the method further comprising, after configuring the host unit interface to operate in the root complex mode:
    determining that the host unit interface is to be reconfigured to operate in the endpoint mode while coupled to a second I/O board without power cycling or resetting the data processing unit; and
    in response to determining that the host unit interface is to be reconfigured to operate in the endpoint mode, reconfiguring the host unit interface to operate in the endpoint mode.

6. The method of claim 5, further comprising receiving a reset signal from the second I/O board.

7. The method of claim 5, wherein determining that the host unit interface is to be reconfigured comprises detecting a status change of one or more present-lines of the host unit interface.

8. The method of claim 1, wherein the host unit interface comprises a first host unit interface of the data processing unit, and wherein the second device comprises a first I/O board, the method further comprising:
    initially configuring a second host unit interface of the data processing unit to operate in the endpoint mode, wherein the second host unit interface is communicatively coupled to a second I/O board;
    retrieving vital product data (VPD) from the second I/O board; and
    confirming that the second host unit interface is to operate in the endpoint mode using the VPD.

9. The method of claim 8, further comprising receiving a reset signal from the second I/O board.

10. The method of claim 8, wherein initially configuring the second host unit interface comprises initially configuring the second host unit interface to operate in the endpoint mode at power up, after a cold reboot, when the second I/O board only supports the root complex mode, or at detection of a status change of one or more present-lines of the second host unit interface.

11. A data processing device comprising:
a host unit interface configured to be communicatively coupled to a second device via a serial input/output (I/O) connection; and
a control unit implemented in circuitry and configured to:
initially configure the host unit interface of a data processing unit to operate in endpoint mode for the serial I/O connection;
determine that the host unit interface of the data processing unit is to switch from operating in the endpoint mode to root complex mode for the serial I/O connection;
in response to determining that the host unit interface is to switch from operating in the endpoint mode to the root complex mode for the serial I/O connection:
configure the host unit interface to operate in the root complex mode for the serial I/O connection; and
send data to an I/O expander unit to cause the I/O expander unit to issue a reset signal to the second device, the second device being configured to operate in the endpoint mode for the serial I/O connection.

12. The data processing device of claim 11, further comprising a configuration register configured to send the data to the I/O expander unit.

13. The data processing device of claim 11, wherein the serial I/O connection comprises PCI Express (PCIe) and the host unit interface comprises a PCIe interface.

14. The data processing device of claim 11, further comprising a register to receive an endpoint reset signal via an endpoint reset line, wherein the I/O expander unit is configured to multiplex the endpoint reset line with a root complex signal line by which to issue the reset signal to the second device.

15. The data processing device of claim 14, wherein the register is coupled to a buffer via the endpoint reset line.

16. The data processing device of claim 11, wherein the second device comprises a first I/O board, and wherein the control unit is configured to, after configuring the host unit interface to operate in the root complex mode:
determine that the host unit interface is to be reconfigured to operate in the endpoint mode while coupled to a second I/O board without power cycling or resetting the data processing unit; and
in response to determining that the host unit interface is to be reconfigured to operate in the endpoint mode, reconfigure the host unit interface to operate in the endpoint mode.

17. The data processing device of claim 16, further comprising a register to receive an endpoint reset signal via an endpoint reset line from the second I/O board, wherein the I/O expander unit is configured to multiplex the endpoint reset line with a root complex signal line by which to issue the reset signal to the first I/O board.

18. The data processing device of claim 16, wherein the host unit interface comprises one or more present-lines initially coupled to the first I/O board, wherein the control unit is configured to determine that the host unit interface is to be reconfigured to operate in the endpoint mode in response to detecting a change of status of the one or more present-lines.

19. The data processing device of claim 11, wherein the host unit interface comprises a first host unit interface of the data processing unit, the control unit comprises a first control unit, and wherein the second device comprises a first I/O board, further comprising:
a second host unit interface communicatively coupled to a second I/O board separate from the data processing device; and
a second control unit implemented in circuitry and configured to:
initially configure the second host unit interface to operate in the endpoint mode, wherein the second host unit interface is communicatively coupled to a second I/O board;
retrieve vital product data (VPD) from the second I/O board; and
confirm that the second host unit interface is to operate in the endpoint mode using the VPD.

20. A system comprising:
an input/output (I/O) expander unit; and
a data processing unit comprising a host unit interface coupled to a second device separate from the data processing device and a control unit implemented in circuitry and configured to:
initially configure the host unit interface of the data processing unit to operate in endpoint mode for a serial input/output (I/O) connection;
determine that the host unit interface of the data processing unit is to switch from operating in the endpoint mode to root complex mode for the serial I/O connection;
in response to determining that the host unit interface is to switch from operating in the endpoint mode to the root complex mode for the serial I/O connection:
configure the host unit interface to operate in the root complex mode for the serial I/O connection; and
send data to the I/O expander unit to cause the I/O expander unit to issue a reset signal to the second device, the second device being configured to operate in the endpoint mode for the serial I/O connection,
wherein the I/O expander unit is configured to issue the reset signal to the second device in response to receiving the data from the control unit of the data processing unit.

21. The system of claim 20, further comprising a buffer communicatively coupled to a register of the host unit interface and to an output of the I/O expander unit.

22. The system of claim 20, further comprising a buffer comprising interfaces for one or more present lines and a wake signal line to the second device.

* * * * *